US006920153B2

(12) United States Patent
Ellis et al.

(10) Patent No.: US 6,920,153 B2
(45) Date of Patent: Jul. 19, 2005

(54) ARCHITECTURE AND ADDRESSING SCHEME FOR STORAGE INTERCONNECT AND EMERGING STORAGE SERVICE PROVIDERS

(75) Inventors: Donald R. Ellis, Ottawa (CA); Don Cawthorne, Darien, IL (US); Silvo J. Frank, Cumberland (CA); Sylvain Demargerie, Ottawa (CA); Chris Murton, Chelmsford (GB); Silvana Romagnino, Kanata (CA); R. Bruce Wallace, Ashton (CA)

(73) Assignee: Nortel Networks Limited, St. Laurent ( * ) Notice: Subject to any disclaimer, the term of this patent is extended or adjusted under 35 U.S.C. 154(b) by 898 days.

(21) Appl. No.: 09/822,181

(22) Filed: Apr. 2, 2001

(65) Prior Publication Data

US 2002/0010790 A1 Jan. 24, 2002

Related U.S. Application Data

(60) Provisional application No. 60/218,970, filed on Jul. 17, 2000, and provisional application No. 60/223,911, filed on Aug. 9, 2000.

(51) Int. Cl.[7] .................................................. H04J 3/24
(52) U.S. Cl. ....................................... 370/475; 370/466
(58) Field of Search ............................. 370/351–4, 338, 370/395.1, 395.6, 409, 412, 466–476

(56) References Cited

U.S. PATENT DOCUMENTS

2002/0194294 A1 * 12/2002 Blumenau et al. .......... 709/213

2003/0091037 A1 * 5/2003 Latif et al. .................. 370/355
2003/0236945 A1 * 12/2003 Nahum ....................... 711/114
2004/0151188 A1 * 8/2004 Maveli et al. .............. 370/398
2004/0174867 A1 * 9/2004 Nelson et al. .............. 370/352

* cited by examiner

Primary Examiner—David Vicent
(74) Attorney, Agent, or Firm—Hunton & Williams LLP (57) ABSTRACT

A technique for enabling a shared storage provider (SSP) to provide shared data storage to a plurality of customers while providing greater privacy and security of each customer's data by implementing a virtual private (VP) addressing scheme is disclosed. The technique also allows a storage networking service carrier to provide connectivity between a plurality of customer storage networking sites, keeping each customer separate from each other. In one embodiment, the technique is realized by network architecture and a scheme to separate and virtualize storage traffic and stored data on a shared infrastructure. Functionally, the scheme provides for the following features: translation between user storage network addresses to carrier addresses; recovery of user storage network addresses when data is returned to the user; use of the carrier assigned addresses to separate the users within the carrier's network; recognition of user storage address within the storage device for partitioning within the user's storage space assigned by the SSP; Storage virtualization or the logical representation of a storage independently of its physical organization; and the displacement of address mapping and virtualization functions away from devices directly attached to storage. All of the above can be implemented singly or in combination, by any networking technology including SONET, ATM, IP, Ethernet and Fiber Channel network technologies.

24 Claims, 6 Drawing Sheets

ARCHITECTURE AND ADDRESSING SCHEME FOR STORAGE INTERCONNECT AND EMERGING STORAGE SERVICE PROVIDERS

CROSS-REFERENCE TO RELATED APPLICATIONS

This patent application claims priority to U.S. Provisional Patent Application No. 60/218,970, filed Jul. 17, 2000 and U.S. Provisional Patent Application No. 60/223,911, filed Aug. 9, 2000, which are hereby incorporated by reference herein in their entirety.

FIELD OF THE INVENTION

The present invention relates generally to addressing and managing data between interconnected storage area networks (SANs). In particular, to a technique for enabling a storage service provider (SSP) to provide shared data storage to a plurality of customers while ensuring the privacy and security of each customer's data by implementing a virtual private (VP) addressing scheme.

BACKGROUND OF THE INVENTION

Under the present mode of operation, many enterprises build and administer private SANs to store their digital information. Typically, the SAN is isolated from outside access to ensure that the stored information remains private. However, there is considerable expense and inefficiency associated with building and maintaining a private SAN. Other drawbacks exist.

Carrier networks and SSPs attempt to eliminate these drawbacks by offering shared storage networks. However, in order to be effective, any shared storage scheme should provide for separation of customer information to insure data integrity and privacy.

Existing systems achieve customer separation by implementing separate physical connections and separate physical storage devices for each customer. This solution can be costly, decrease operational simplification, and have other drawbacks.

Existing systems traditionally implement direct connection between servers and storage devices via SCSI or other direct point-to-point connections. The advent of Fibre Channel (FC) networking allows connections through a switched network or arbitrated loop. The FC structure includes addressing which is private within the domain of a single enterprise. However, one drawback of this approach is that no two devices are allowed to have the same address, also, there are no robust security mechanisms today that would completely protect one device from being accessed by any other. This leads to addressing conflicts and privacy issues if several enterprises share the network and infrastructure.

Some storage devices offer internal customer separation based on port and/or worldwide name. This, however, does not address the problem of sharing the network upstream of (including SAN switched network and carrier access network) the storage device. Some storage devices also offer internal storage virtualization, but then distribution of the customer data is limited to the capacity of that one storage device.

In view of the foregoing, it would be desirable to provide a technique for shared data storage which overcomes the above-described inadequacies and shortcomings. More particularly, it would be desirable to provide a technique for avoiding addressing conflicts and providing greater privacy for each SAN customer in an efficient and cost effective manner.

SUMMARY OF THE INVENTION

According to the present invention, a technique for translating a customer address of a first data packet to a carrier address of a second data packet, wherein the customer address corresponds to a location in a customer network and the carrier address corresponds to a location in a carrier access network that provides access to the customer network is provided. In one embodiment, the technique is realized by first receiving the first data packet at a carrier access network, wherein the first data packet comprises a first header containing customer source information and customer destination information. Next, the technique is realized by swapping the customer source information and the customer destination information in the first header with carrier assigned source information and carrier assigned destination information to form the second data packet, wherein the second data packet comprises a second header containing the carrier assigned source information and carrier assigned destination information.

In accordance with other aspects of the present invention, the technique includes restoring the customer source information and the customer destination information in the first header so as to recover the first data packet.

In accordance with further aspects of the present invention, the customer address is a shared storage network address.

In accordance with still further aspects of the present invention, the technique further entails processing the second data packet within the carrier access network according to the second header containing the carrier assigned source information and carrier assigned destination information.

In accordance with further aspects of the present invention the technique may entail storing the second data packet in a shared storage network.

In accordance with further aspects of the present invention the technique may entail using a customer network accessible by one or more customers. The one or more customers send a plurality of the first data packets to the customer network over the carrier access network and the technique includes separating the second data packet by customer.

According further aspects of the invention, a technique for translating a storage network address of a first data packet to a carrier address of a second data packet, wherein the storage network address corresponds to a storage location in a storage network and the carrier address corresponds to a location in a carrier access network that provides access to the storage network is provided. In one embodiment, the technique is realized by first receiving the first data packet at a carrier access network, wherein the first data packet comprises a first header containing first source information and first destination information. Next, the technique is realized by encapsulating the first data packet within the second data packet, wherein the second data packet comprises a second header containing second source information and second destination information.

In accordance with other aspects of the present invention, the technique includes removing the first data packet from the second data packet so as to restore the first data packet and first header containing the first source information and the first destination information.

In accordance with further aspects of the present invention, the storage network address is a shared storage network address.

In accordance with still further aspects of the present invention, the technique further entails processing the second data packet within the carrier access network according to the second header containing the second source information and second destination information.

In accordance with further aspects of the present invention the technique may entail storing the second data packet in a shared storage network.

In accordance with further aspects of the present invention the technique may entail using a shared storage network accessible by one or more customers. The one or more customers send a plurality of the first data packets to the shared storage network over the carrier access network and the technique includes separating the second data packet by customer.

The present invention comprises network architecture and a scheme to separate and virtualize storage traffic and stored data on a shared infrastructure. Advantages of the scheme include the following: allows several users to use the same network to transport data to/from mass storage devices; allows several users to share the same storage devices as if they had their own dedicated storage device; ensures that data from one user is not accessible by any other user; makes the addressing scheme used by any one user's network independent and invisible to other users; and makes the addressing scheme used by the users independent of the addressing scheme used within the carrier or service provider network.

Functionally, the scheme provides for the following features: translation between user storage network addresses to carrier addresses; recovery of user storage network addresses when data is returned to the user; use of the carrier assigned addresses to separate the users within the carrier's network; recognition of user storage address within the storage device for partitioning within the user's storage space assigned by the SSP; Storage virtualization or the logical representation of a storage independently of its physical organization; and the displacement of address mapping and virtualization functions away from devices directly attached to storage.

All of the above can be implemented singly or in combination. The principles of the scheme can be applied to any networking technology including SONET, ATM, IP, Ethernet and Fiber Channel network technologies.

The scheme is not geographically limited (i.e. it can be used within a building, campus, city, . . . up to world-wide) and is applicable by (but not limited to) the following types of applications: carriers who provide data connectivity and transport services between sites; Storage Service Providers (SSP) that provide data storage services for customers and may or may not themselves provide data connectivity and transport services; other Service Providers (xSP) that may bundle data storage services with their offerings; and enterprises, including carriers, SSPs and xSP, who within their own organization wish to segregate user data for confidentiality or management reason.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
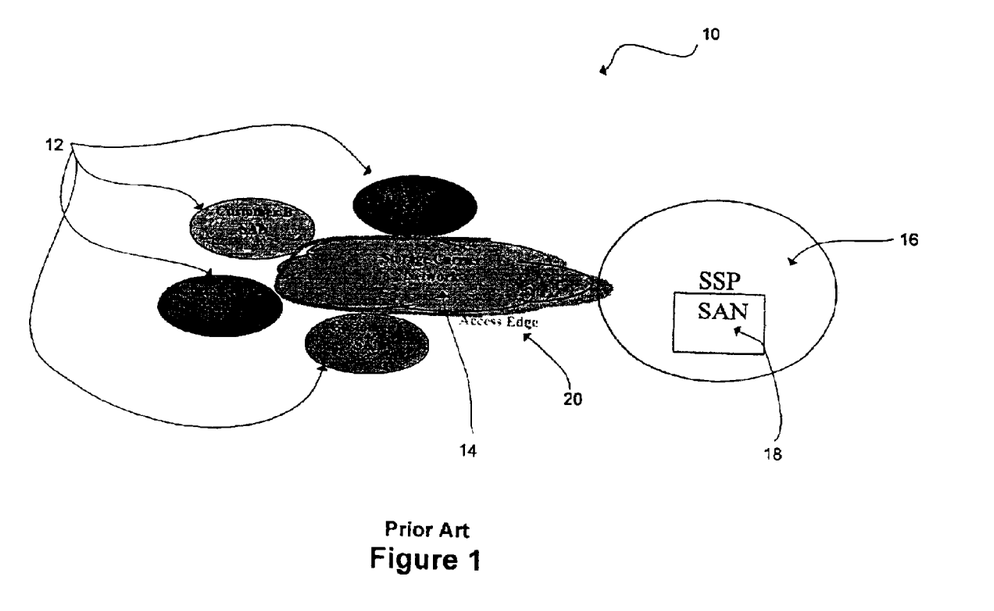
FIG. 1 is a schematic representation of the basic components of a storage network.

FIG. 1 is a schematic representation of the basic components of a storage network 10. Each customer has their own SAN 12 connected to a carrier network 14. Also connected to carrier network 14 is SSP 16 with it own SAN 18. In some embodiments, the SSP 16 may also control carrier network 14. Access edge 20 denotes the boundary between customer SAN 12 and carrier network 14.

As described above, the SSP 16 provides storage space in SAN 18 to one or more customers (e.g., customers A, B, C, in FIG. 1). The customers access the storage space in SAN 18 via carrier network 14. The customers may also link two or more of their own SANs 12 via carrier network 14.

In general, a SAN (e.g., customer SAN 12 or SSP SAN 18) is composed of mass storage devices connected by equipment to various processor based devices. In some embodiments, a customer may implement a degenerate SAN where there is no storage and a single connection between a processor based device and the carrier network 14.

In a carrier network implementing an FC network two basic types of ports may exist on a switch. An F-port connects to an end device such as a sever of storage device. An E-port connects to another switch.

As discussed above, when two switches are connected through an E-port, all devices on one switch are visible to devices on the other switch and vice versa. In most situations a customer connects to an SSP through an F-port, as the customer typically does not wish to make all the devices on the network visible to the SSP and vice versa.

Within an enterprise, however, a customer may wish to link two sites with an E-port through a carrier network. The present invention works for both E-port and F-port connections.

The FC address that are administered by the enterprise are usually considered to be private and not administered by the carrier or SSP. The intent of some embodiments of this invention is to use a "virtual private" (VP) address assigned by the carrier or SSP in the carrier network or SSP SAN (hereinafter carrier/SSP); and not to use the private FC address. The carrier/SSP assigns a VP address for each physical port on the Carrier access network, thus a customer with n physical ports (sites) will have assigned to it n VP addresses.

In some embodiments, on entry to the carrier/SSP network, or at any point beyond which separation is desired, the customer is assigned a VP address. Within the carrier/SSP data network the VP addresses are used for data routing. The carrier/SSP only has VP addresses to manage.

Similarly, on exit of the carrier/SSP network, or at any point where separation is no longer desired, the user's original address are used/restored. The user or customer never needs to know about the carrier/SSP assigned VP address and only works within the confines of his own addressing space.

Figure 2:
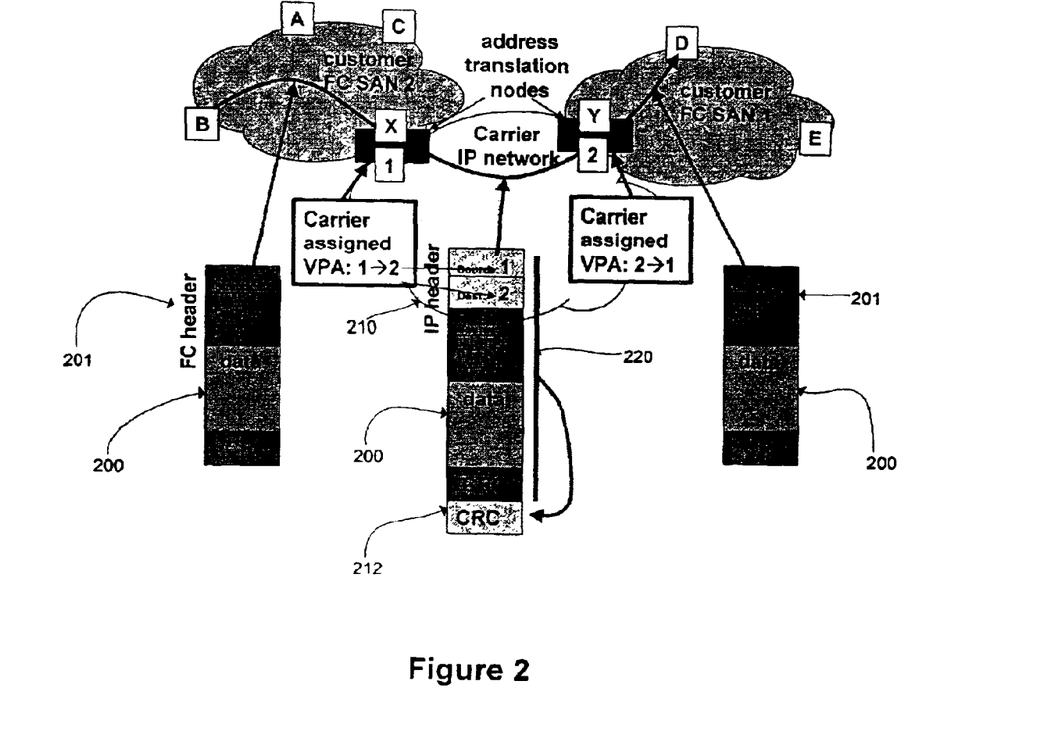
FIG. 2 illustrates a mechanism for Virtually Private (VP) address encapsulation to tunnel FC packets and maintain separation over an IP Carrier network according to one embodiment of the invention.

For instance, FIG. 2 illustrates a mechanism for VP address encapsulation to tunnel FC packets and maintain separation over an IP Carrier network. One of the basic advantages of IP encapsulation is the ubiquity of the protocol and associated management tools, however, other similar encapsulation can be used. Similarly, the principle also applies if the customer SAN uses protocols other than FC.

As shown in FIG. 2, a data packet 200, originating from source B in customer FC SAN 2, is to be routed to destination D in customer FC SAN 1. The source and destination address in the customer's SANs are stored in FC packet header 201. Upon entry to carrier network access node X, data packet 200 is encapsulated within a new packet 220 with Virtual Private Addressing (VPA) assigned by carrier/SSC. As shown, encapsulation of data packet 220 may comprise assigning a carrier/SSC header 210 with source and destination information for routing within carrier/SSC network. For example, carrier/SSC header 210 may comprise source 1 and destination 2 information. Upon reaching the carrier/SSC destination, or other point where encapsulation is no longer desired, data packet 200 may be removed from packet 220 and restored to its original configuration (e.g., with original header 201).

In some embodiments, another possibility that may occur for encapsulating data packet 200, if the Carrier/SSP is an FC network, is to swap the addresses within the FC header 201. In this case the user addresses would be moved to an unused portion of the FC header 201 while the FC destination and source were replaced with the Carrier assigned virtual private addresses (VPAs).

Additional functionality can be added to this scheme. For instance, more complex address mapping rules are also possible (e.g., see below); address learning can be implemented at the address translation nodes; and the Carrier network can be implemented as a distributed virtual storage switch.

In all cases discussed above, the essence of the invention is to apply Virtual Private Networking (VPN) techniques to storage networking. This allows the carrier to transport customer packets through the carrier network using the carrier's own addressing scheme and without intruding on the customer's addressing scheme.

Embodiments of the invention also implement the principle of error monitoring and potentially correction between any two points that implement VP address translation/encapsulation and recovery. For example, in FIG. 2 everywhere an address translation/encapsulation occurs, a Cyclic Redundancy Check (CRC) 212 is computed for the data packet with the VP address and added to the data packet. On arrival, the CRC 212 is recomputed and checked against the value sent with the packet. Any discrepancy indicates and error condition. Higher order Error Correction Codes (ECC) can also be used which can allow some error recover in addition to detection.

Transit Error monitoring allows the Carrier/SSP to provide greater security and reliability for Service Level Agreements with customers and to quickly locate faults in the network. Other fault/error detection, monitoring and correction techniques apply.

The present invention address translation/recovery method is not limited to linear static mapping of a port to a VPA. The translating device may actually perform the role of storage virtualization where customer FC addresses and SCSI device coordinates (block position reference within a storage medium) are translated according to rules specified by the carrier/SSP. Storage virtualization provides the customer access to storage as if it were entirely dedicated to that customer. In reality, however, the customer's data may be spread amongst several physical devices and/or occupy only part of a device also used by others.

The rules, also known as meta-data, required to translate from the customer's addresses and coordinates to what is physically implemented must enforce non overlapping mapping so that that no two customers can access the same storage region. By adjusting the rule parameters, the carrier/SSP can affect such service functions as allocating more or less storage space to a client.

Figure 3A:
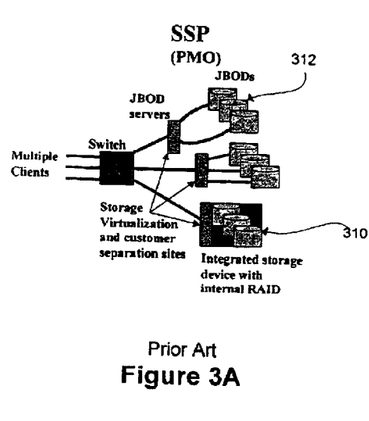
FIG. 3A illustrates a prior art scheme of storage virtualization.
Figure 3B:
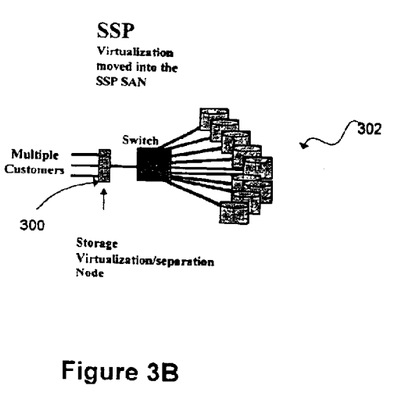
FIG. 3B illustrates storage virtualization according to one embodiment of the invention.

As shown in FIG. 3B, Storage Virtualization is an extension of Virtual Private Addressing and can be advantageously deployed near the entry point of a carrier/SSP network. By placing the virtualization point 300 at the network edge it is possible to dynamically grow the storage resources allocated to a customer without limits of any particular storage device (i.e. more devices 302 can simply be added to the network as a whole, without any change for the user). In case of storage device failure or maintenance it is also possible to automatically reroute the customer transaction to alternate storage devices.

As illustrated in FIG. 3A, Redundant Arrays of Independent Disks (RAID) 310, Just a Bunch Of Disks (JBODs) 312 and data "stripping" technologies are forms of storage virtualization that include the distribution of data to several storage disks at a time, optionally enhancing it with ECC so that data can be recovered even if one (or more depending on the ECC coding) disk fails. Until now, however, such technologies were either internal to multi-disk storage devices, or external restricted to controlling directly attached or loop attached storage disks. Placing ECC encoding further upstream from the storage devices as proposed by the present invention can protect from both transmission errors and storage media errors.

Disk caching is often associated with storage virtualization. Among other functions, the cache provides a transient area where data packets can be assembled/disassembled before distribution to or collection from an array of disks. Another function of the cache is to keep frequently accessed data for fast delivery. Here we implicitly include caching as one of the virtualization functions.

From the customer's perspective the storage virtualization device appears in all significant ways as a data storage device dedicated to his sole usage. In reality, however, the physical medium where the data is permanently stored can be distributed to any and many storage devices attached to the carrier/SSP storage network.

FIGS. 3A and 3B illustrate one of the concepts of the present invention, which is to move storage virtualization away from the storage devices to occupy a position closer to the customer access edge. Not shown below is the fact that virtualization nodes may actually be cascaded (i.e. one virtualization node can direct data to/from another node).

Figure 4:
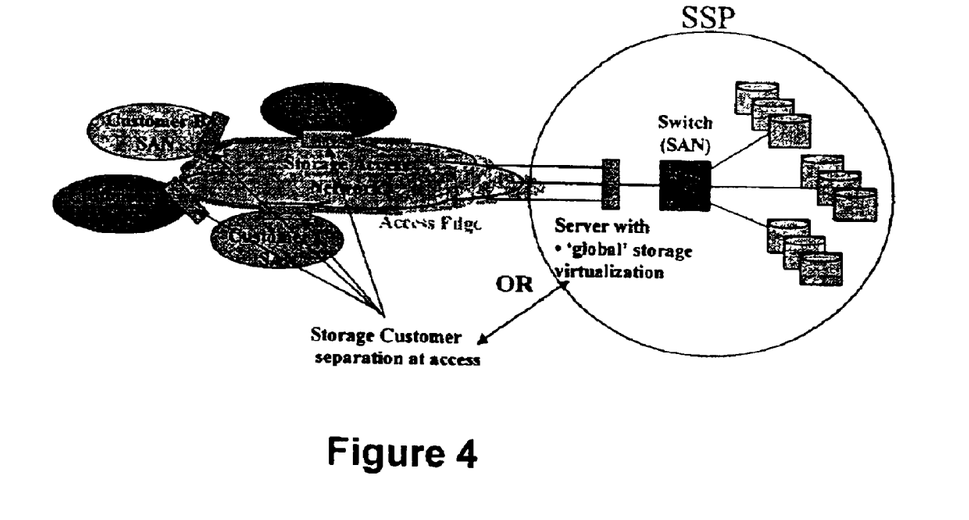
FIG. 4 illustrates storage virtualization at the SSP SAN boundary combined with simple address translation at the customer boundary for network separation in the Carrier Network according to one embodiment of the invention.

FIG. 4 shows how storage virtualization at the SSP SAN boundary can be combined with simple address translation at the customer boundary for network separation in the Carrier Network.

Figure 5:
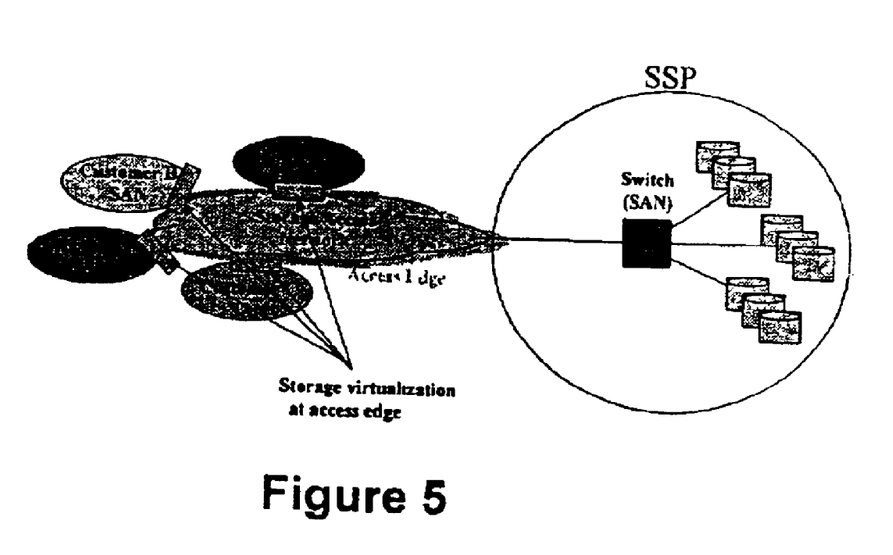
FIG. 5 illustrates storage virtualization and separation occurring directly at the customer access edge according to one embodiment of the invention.

Alternately, the storage virtualization (and separation) can occur directly at the customer access edge, as illustrated in FIG. 5. In all cases the invention consists of implementing customer separation and storage virtualization away from the storage devices themselves.

Figure 6A:
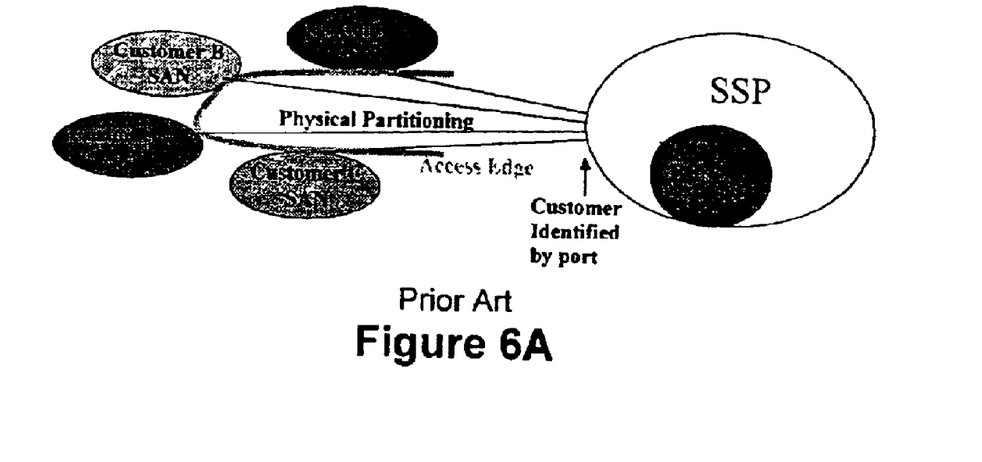
FIG. 6A illustrates a prior art address separation scheme.
Figure 6B:
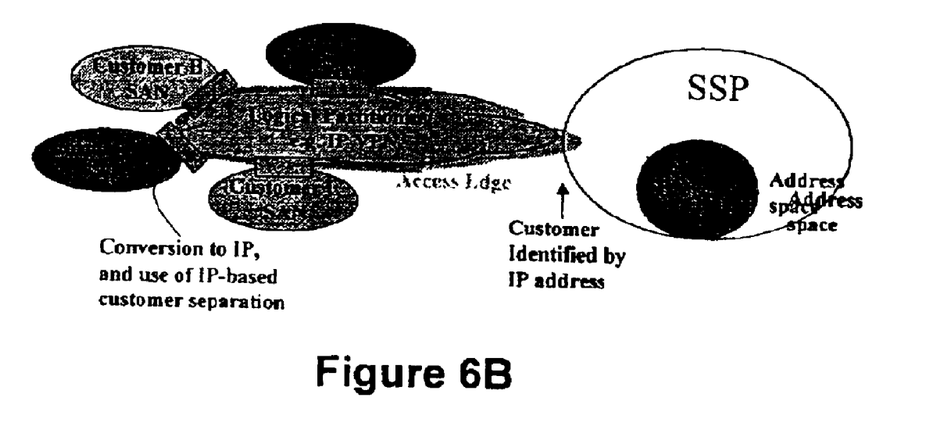
FIG. 6B illustrates provisioning dedicated links from the customers to the SSP using SONET, wavelength or fibers as a physical separation mechanism according to one embodiment of the invention.

The carrier may choose to provision dedicated links from the customers to the SSP using SONET, wavelength or fibers as a physical separation mechanism. This is illustrated in FIG. 6B and contrasted to the address separation scheme shown in FIG. 6A.

The above concepts (user separation, virtualization, error monitoring, etc.) may be implemented in storage network nodes (devices through which information transits). These functions may be implemented as software running on dedicated servers or combined with network switches or terminal adapters (NICs or HBAs) In particular some functions, such as encapsulation, are easier to implement in hardware (more efficient), while others will require a software approach for some time to come. An effective technique consists of defining Slow and Fast data paths corresponding to whether a packet can be processed in hardware or in software. The Slow path software processor or CPU might undertake calculations for connection set-up and then download the routing rules to the hardware processor for Fast forwarding of subsequent packets.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for translating a customer address of a first data packet to a carrier address of a second data packet, wherein the customer address corresponds to a location in a customer network and the carrier address corresponds to a location in a carrier access network that provides access to the customer network, the method comprising:

receiving the first data packet at a carrier access network, wherein the first data packet comprises a first header containing customer source information and customer destination information; and swapping the customer source information and the customer destination information in the first header with carrier assigned source information and carrier assigned destination information to form the second data packet, wherein the second data packet comprises a second header containing the carrier assigned source information and carrier assigned destination information.

2. The method of claim 1, further comprising:

restoring the customer source information and the customer destination information in the first header so as to recover the first data packet.

3. The method of claim 1, wherein the customer address is a shared storage network address.

4. The method of claim 1, further comprising the step of:

processing the second data packet within the carrier access network according to the second header containing the carrier assigned source information and carrier assigned destination information.

5. The method of claim 1, further comprising:

storing the second data packet in a shared storage network.

6. The method according to claim 1, wherein the customer network comprises a shared storage network accessible by one or more customers, and the one or more customers send a plurality of the first data packets to the shared storage network over the carrier access network, the method further comprising:

separating the second data packet by customer.

7. An apparatus for translating a customer address of a first data packet to a carrier address of a second data packet, wherein the customer address corresponds to a location in a customer network and the carrier address corresponds to a location in a carrier access network that provides access to the customer network, the apparatus comprising:

an address translation node for receiving the first data packet at a carrier access network, wherein the first data packet comprises a first header containing customer source information and customer destination information; and a first address translation module for swapping the customer source information and customer destination information in the first header with carrier assigned source information and carrier assigned destination information to form the second data packet, wherein the second data packet comprises a second header containing the carrier assigned source information and the carrier assigned destination information.

8. The apparatus of claim 7, further comprising:

a second address translation module for restoring the customer source information and the customer destination information in the first header to recover the first data packet.

9. The apparatus of claim 7, wherein the customer address is a shared storage network address.

10. The apparatus of claim 7, further comprising:

a processing module to process the second data packet within the carrier access network according to the second header containing the carrier assigned source information and carrier assigned destination information.

11. The apparatus of claim 7, further comprising:

a storage module for storing the second data packet in a shared storage network.

12. The apparatus according to claim 7, wherein the customer network comprises a shared storage network accessible by one or more customers, and the one or more customers send a plurality of the first data packets to the shared storage network over the carrier access network, the apparatus further comprising:

a separating module for separating the second data packet by customer.

13. A method for translating a storage network address of a first data packet to a carrier address of a second data packet, wherein the storage network address corresponds to a storage location in a storage network and the carrier address corresponds to a location in a carrier access network that provides access to the storage network, the method comprising:

receiving the first data packet at a carrier access network, wherein the first data packet comprises a first header containing first source information and first destination information; and encapsulating the first data packet within the second data packet, wherein the second data packet comprises a second header containing second source information and second destination information.

14. The method of claim 13, further comprising:

removing the first data packet from the second data packet so as to restore the first data packet and first header containing the first source information and the first destination information.

15. The method of claim 13, wherein the storage network address is a shared storage network address.

16. The method of claim 13, further comprising the step of:

processing the second data packet within the carrier access network according to the second header containing the second source information and second destination information.

17. The method of claim 13, further comprising:

storing the second data packet in a shared storage network.

18. The method according to claim 13, wherein the storage network comprises a shared storage network accessible by one or more customers, and the one or more customers send a plurality of the first data packets to the shared storage network over the carrier access network, the method further comprising:

separating the second data packet by customer.

19. An apparatus for translating a storage network address of a first data packet to a carrier address of a second data packet, wherein the storage network address corresponds to a storage location in a storage network and the carrier address corresponds to a location in a carrier access network that provides access to the storage network, the apparatus comprising:

an address translation node for receiving the first data packet at a carrier access network, wherein the first data packet comprises a first header containing first source information and first destination information; and an encapsulation module for encapsulating the first data packet within the second data packet, wherein the second data packet comprises a second header containing second source information and second destination information.

20. The apparatus of claim 19, further comprising:

a removal module for removing the first data packet from the second data packet so as to restore the first data packet and first header containing the first source information and the first destination information.

21. The apparatus of claim 19, wherein the storage network address is a shared storage network address.

22. The apparatus of claim 19, further comprising:

a processing module to process the second data packet within the carrier access network according to the second header containing the second source information and second destination information.

23. The apparatus of claim 19, further comprising:

a storage module for storing the second data packet in a shared storage network.

24. The apparatus according to claim 19, wherein the storage network comprises a shared storage network accessible by one or more customers, and the one or more customers send a plurality of the first data packets to the shared storage network over the carrier access network, the apparatus further comprising:

a separating module for separating the second data packet by customer.

* * * * *